United States Patent [19]
Thelen et al.

[11] Patent Number: 5,769,612
[45] Date of Patent: Jun. 23, 1998

[54] MODULAR BYPASS SYSTEM FOR A SUPERCHARGER

[75] Inventors: Daniel L. Thelen, Marshall; Glen R. Alden, Homer, both of Mich.

[73] Assignee: Eaton Corporation, Cleveland, Ohio

[21] Appl. No.: 784,797

[22] Filed: Jan. 16, 1997

[51] Int. Cl.$^6$ .................................................. F04B 49/00
[52] U.S. Cl. ........................... 417/310; 137/569; 251/305
[58] Field of Search ........................ 417/310; 137/454.2, 137/569; 251/305, 58, 251, 257

[56] References Cited

U.S. PATENT DOCUMENTS

| | | | |
|---|---|---|---|
| 1,818,767 | 8/1931 | Swartwout . | |
| 2,956,585 | 10/1960 | Alsworth et al. | 137/569 |
| 3,102,382 | 9/1963 | Bozzula | 60/13 |
| 4,763,636 | 8/1988 | Tamura et al. | 123/564 |
| 4,823,758 | 4/1989 | Tamura et al. | 417/310 |
| 4,991,562 | 2/1991 | Chujo | 417/310 |
| 5,078,583 | 1/1992 | Hampton et al. | 418/201.1 |
| 5,115,788 | 5/1992 | Sasaki et al. | 417/310 |
| 5,238,220 | 8/1993 | Shell et al. | 251/305 |

*Primary Examiner*—Charles G. Freay
*Attorney, Agent, or Firm*—L. J. Kasper

[57] ABSTRACT

A rotary blower (26) of the type used for supercharging a vehicle internal combustion engine includes an inlet housing (48) defining an inlet port (30) and an outlet port (34). The blower housing defines a bypass passage (38), through which outlet port fluid is bypassed back to the inlet port (30) whenever supercharging of the engine is not needed. The blower housing also defines a bypass bore (52) open to the exterior of the housing and intersecting the bypass passage (38). A bypass module (54) is disposed within the bypass bore (52) and includes a housing assembly (55). Within the bypass module (54) is a bypass valve member (92) which, in the subject embodiment, includes a cam portion (96), whereby the bypass valve (92) may be actuated by axial movement of a diaphragm (64) and a lever (74). The bypass module (54) cooperates with the housing (48) to define a retention arrangement (100–106), whereby the module is merely inserted into the bore (52), rotated to its assembled position (FIG. 3), and then appropriate vacuum and pressure lines are connected to one or both of a vacuum port (60) and a pressure port (62). The bypass module (54) of the invention provides a simple, inexpensive bypass valve arrangement which substantially reduces the cost of machining of the inlet housing (48), while reducing the time and cost of assembly.

16 Claims, 4 Drawing Sheets

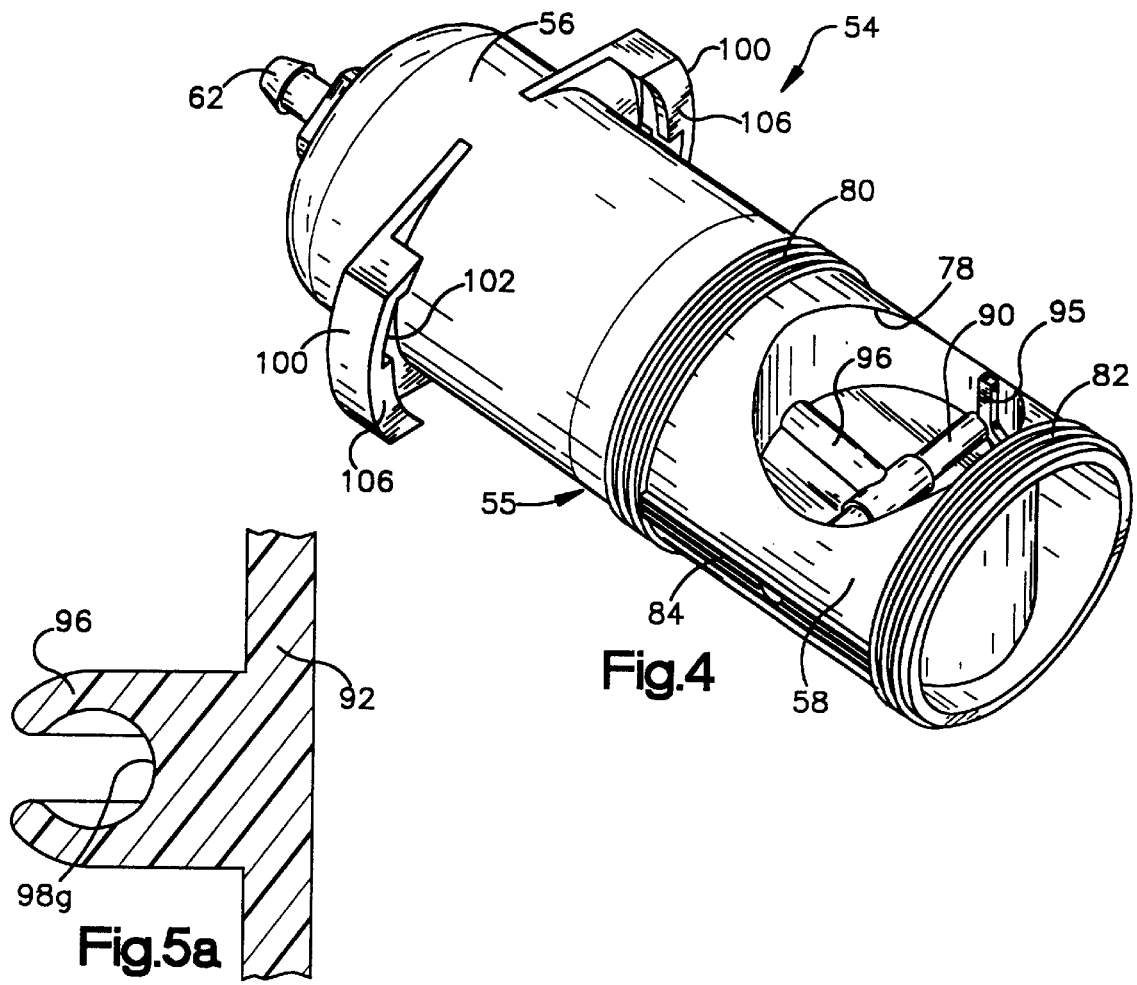
Fig.4
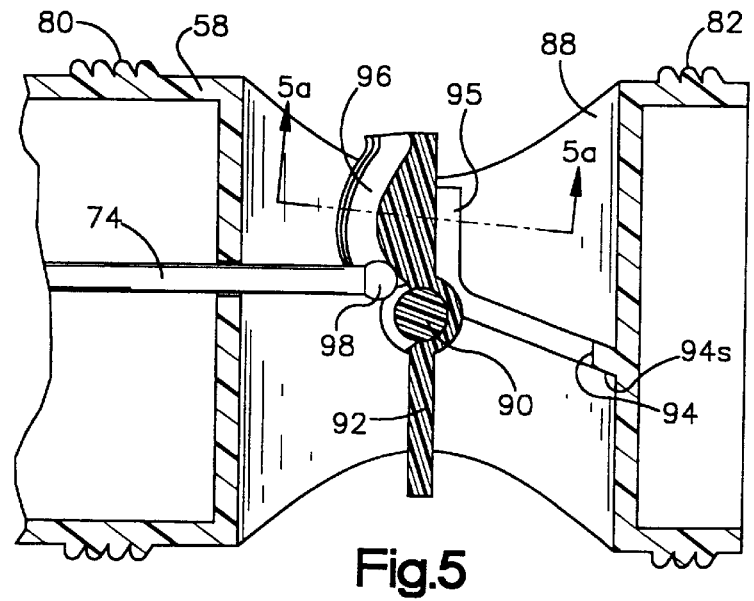
Fig.5a
Fig.5

MODULAR BYPASS SYSTEM FOR A SUPERCHARGER

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to rotary blowers of the backflow type, such as Roots blowers which are used as superchargers for vehicle internal combustion engines, and more particularly, to blowers of the type having bypass valves, operable to communicate outlet fluid back to the inlet.

Roots blower superchargers of the type which can utilize the present invention are illustrated in U.S. Pat. No. 5,078,583, assigned to the assignee of the present invention and incorporated herein by reference. Such blowers typically have a housing assembly defining an inlet port and an outlet port, and a blower chamber or fluid displacement chamber. Disposed within the blower chamber is some sort of displacement mechanism, such as a pair of meshed, lobed rotors, operable to transfer volumes of inlet port fluid to the outlet port.

A typical, prior art Roots blower supercharger is used to boost the air pressure in the intake manifold of an internal combustion engine. Such boost pressure is beneficial in increasing the output horsepower of the engine, but is needed only at certain times during the operation of the vehicle engine. Such blowers are typically mechanically driven by the vehicle engine, and therefore, consume a certain amount of engine horsepower. Therefore, as is well known to those skilled in the art, it has become conventional to provide such blowers with a bypass valve arrangement, whereby, when boost pressure is not needed, or is not beneficial, a bypass valve provides open, relatively unrestricted communication of fluid (air) from the outlet port of the blower back to the inlet port. When the blower is operating with the bypass valve open, the engine horsepower required to drive the blower is substantially reduced.

The bypass valve arrangement which has been used commercially by the assignee of the present invention is illustrated generally in the above-incorporated U.S. Pat. No. 5,078,583. The prior art bypass valve comprises a butterfly-type valve member disposed within a bypass passage of the blower housing. Movement of the butterfly valve between the open and closed positions is controlled by a vacuum actuator mounted on the exterior of the blower housing, and operable to move the butterfly valve by suitable linkage.

The prior art bypass valve arrangement described above has been generally satisfactory, as far as function and performance, but is generally unsatisfactory with regard to manufacturing and assembly costs. It is generally necessary to machine the bypass passage within which the butterfly valve is disposed, and the valve is mounted on a shaft, supported by bearings disposed within machined bores in the blower housing. These bores are disposed on either side of the bypass passage, and therefore, must be aligned with each other, and accurately located with respect to the bypass passage. In addition, the actuator is bolted to the exterior of the blower housing, thus requiring some form of attachment means, such as drilled and tapped holes in the housing, whereby the actuator is bolted to the housing. Finally, the assembly of the valve and actuator, and the adjustment of linkages, and the calibration of the entire assembly all add substantially to the time of assembly, and therefore, the overall cost of the supercharger system.

In the prior art bypass valve arrangement, the machining tolerances on the butterfly plate and the bore must be held quite close so that, when the butterfly plate is in the closed position, it will substantially prevent any flow between the butterfly plate and the bore. On the other hand, the fit between the butterfly plate and the bore must not be such that the plate can stick within the bore if the external adjustment means for the butterfly plate is not set properly. As will be understood by those skilled in the art, once the butterfly plate would stick in the closed position, it would probably remain in that position until manually dislodged.

SUMMARY OF THE INVENTION

Accordingly, it is an object of the present invention to provide an improved rotary blower which overcomes the above-described disadvantages of the prior art, commercially available bypass valve arrangement.

It is a more specific object of the present invention to provide an improved rotary blower, and bypass valve arrangement therefor, which substantially reduces the amount of machining and assembly required, while still achieving the normal, desired bypass valve function.

The above and other objects of the invention are accomplished by the provision of a rotary blower of the backflow type comprising a housing assembly defining an inlet port and an outlet port and a blower chamber disposed intermediate the inlet port and the outlet port. Blower means is disposed in the blower chamber for effecting transfer of volumes of inlet port fluid to the outlet port. The housing assembly defines a bypass passage providing fluid communication from the outlet port to the inlet port, bypassing the blower chamber. A bypass valve member is disposed in the bypass passage and movable between a closed position, blocking flow through the bypass passage, and an open position, permitting flow through the bypass passage in response to an external input pressure signal.

The improved rotary blower is characterized by the housing assembly defining a bypass bore, open to the exterior of the housing assembly, and intersecting the bypass passage. A bypass module is disposed within the bypass bore, and includes a housing assembly defining a signal pressure chamber and an external signal port, adapted for connection to the input pressure signal, and in open communication with the signal pressure chamber. The housing assembly of the module includes a valve housing disposed within the bypass passage, and defining openings to permit fluid flow through the bypass passage, whenever the bypass valve member is in the open position. The bypass valve member is disposed within the valve housing of the module housing assembly, and comprises a movable valve member, movable between the open position and the closed position, the bypass module including means operable to translate changes in the input pressure signal into movement of the bypass valve member.

It is another object of the present invention to provide an improved butterfly-type valve assembly having an improved seal in the closed position, while eliminating the possibility of the butterfly valve becoming stuck within the bore.

It is a still further object of the present invention to provide an improved butterfly type valve assembly which accomplishes the above-stated object, and which eliminates the need for a separate adjustment mechanism.

The above and other objects of the invention are accomplished by the provision of a butterfly-type valve assembly adapted for use as a flow control valve, the butterfly valve assembly including a valve housing defining a generally cylindrical valve bore, and an opening disposed at each end of the valve bore. A butterfly-type valve member is disposed within the valve bore and there is means operably associated with the valve housing and the butterfly valve member whereby the butterfly valve member is pivotable about a pivot axis thereof, between a closed position and an open position. In the open position, a plane defined by the butterfly valve member is oriented generally axially of the valve bore.

The improved butterfly-type valve assembly is characterized by the valve housing defining a sealing lip extending radially inwardly from the valve bore, the sealing lip extending circumferentially about a substantial portion of the valve bore, and defining a sealing surface. The butterfly-type valve member is disposed to engage the sealing surface of the sealing lip when the butterfly valve member is in the closed position.

BRIEF DESCRIPTION OF THE DRAWINGS

FIG. 4 is a perspective view of the modular bypass valve of the present invention.

FIG. 5 is an enlarged, fragmentary view, similar to FIG. 4, illustrating the bypass valve in its open position.

FIG. 5a is a transverse cross-section taken on line 5a—5a of FIG. 5, but on a substantially larger scale.

DESCRIPTION OF THE PREFERRED EMBODIMENT

Figure 1:
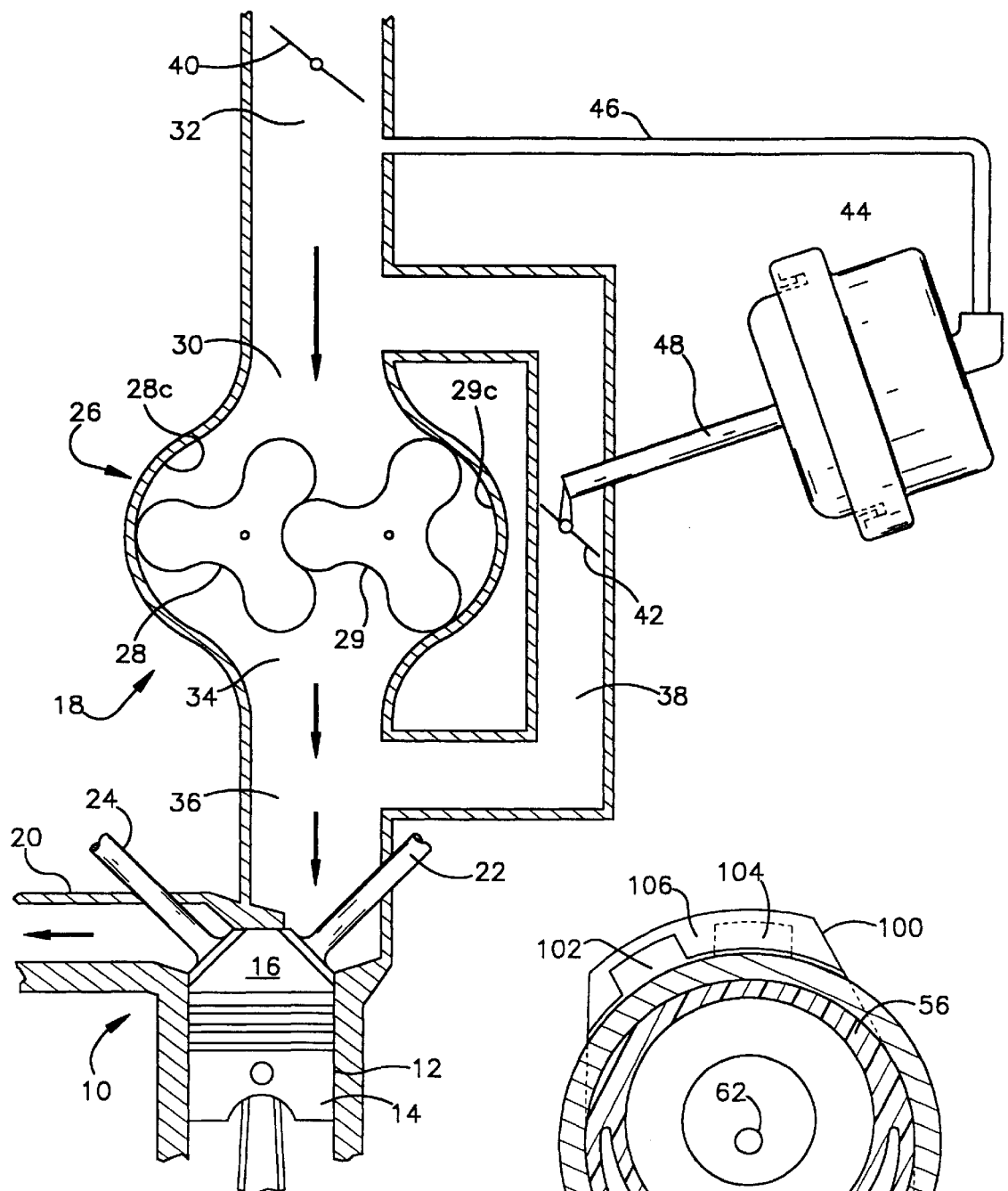
FIG. 1 schematically illustrates an intake manifold assembly including a supercharger and bypass valve assembly made in accordance with the "PRIOR ART"

Referring now to the drawings, which are not intended to limit the invention, FIG. 1 is a schematic illustration of an intake manifold assembly, including a Roots blower supercharger and bypass valve arrangement in accordance with the prior art. An engine, generally designated 10, includes a plurality of cylinders 12, and a reciprocating piston 14 disposed within each cylinder, thereby defining an expandable combustion chamber 16. The engine includes intake and exhaust manifold assemblies 18 and 20 for directing combustion air, respectively, to and from the combustion chamber 16, by way of intake and exhaust valves 22 and 24, respectively.

The intake manifold assembly 18 includes a positive displacement rotary blower 26 of the backflow or Roots type, as is illustrated in above-incorporated U.S. Pat. No. 5,078,583. The blower 26 includes a pair of rotors 28 and 29, each of which includes a plurality of meshed lobes. The rotors 28 and 29 are disposed in a pair of parallel, transversely overlapping cylindrical chambers 28c and 29c, respectively. The rotors may be driven mechanically by engine crankshaft torque transmitted thereto in a known manner, such as by means of a drive belt (not illustrated herein). The mechanical drive rotates the blower rotors at a fixed ratio, relative to crankshaft speed, such that the blower displacement is greater than the engine displacement, thereby boosting or supercharging the air flowing to the combustion chambers 16.

The supercharger or blower 26 includes an inlet port 30 which receives air or air-fuel mixture from an inlet duct or passage 32 (see also FIG. 2), and further includes a discharge or outlet port 34, directing the charge air to the intake valves 22 by means of a duct 36. The inlet duct 32 and the discharge duct 36 are interconnected by means of a bypass passage, shown schematically at 38 (but also shown in FIGS. 2 and 3). If the engine 10 is of the Otto cycle type, a throttle valve 40 preferably controls air or air-fuel mixture flowing into the intake duct 32 from a source, such as ambient or atmospheric air, in a well known manner.

Disposed within the bypass passage 38 is a bypass valve 42 which is moved between an open position and a closed position by means of an actuator assembly, generally designated 44. The actuator assembly 44 is responsive to fluid pressure in the inlet duct 32 by means of a vacuum line 46. Therefore, the actuator assembly 44 is operative to control the supercharging pressure in the discharge duct 36 as a function of engine power demand. When the bypass valve 42 is in the fully open position, air pressure in the duct 36 is relatively low, but when the bypass valve 42 is fully closed, the air pressure in the duct 36 is relatively high. In the "PRIOR ART", the actuator assembly 44 is a separate element and is attached to the exterior of the blower housing, and controls the position of the bypass valve 42 by means of a linkage member 48.

Invention

Figure 2:
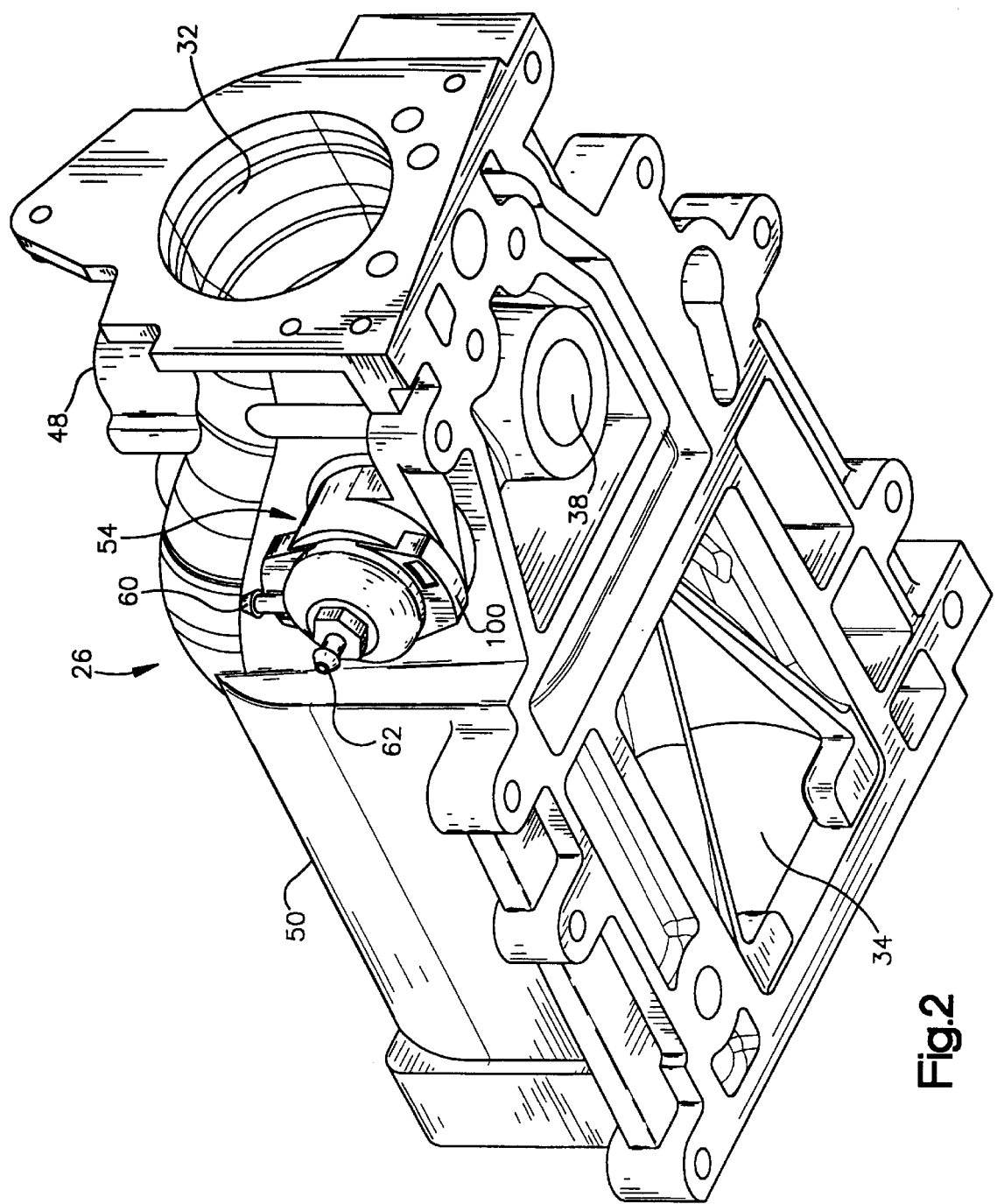
FIG. 2 is a perspective view of a Roots blower supercharger including the modular bypass assembly of the present invention.

Referring now primarily to FIG. 2, the blower 26 comprises an inlet housing 48, which defines the inlet duct 32 and the bypass passage 38, and a main housing 50, which defines the cylindrical chambers 28c and 29c (not visible in FIG. 2). The main housing 50 further defines the outlet port 34 which, as is shown in FIG. 2, is generally triangular.

Figure 3A:
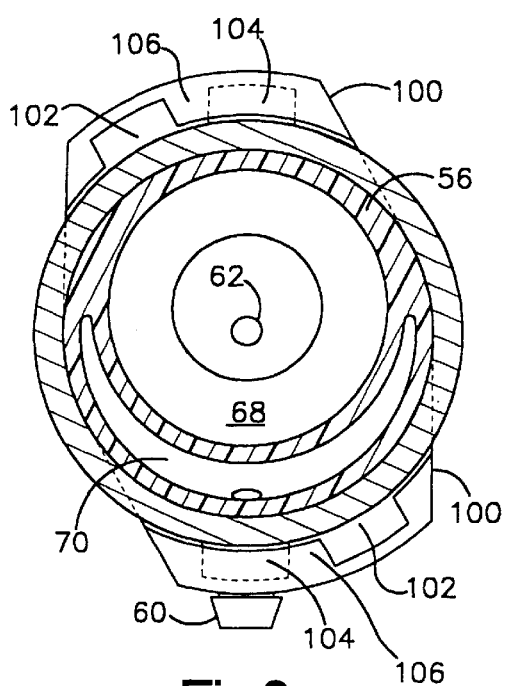
FIG. 3a is a transverse cross-section taken on line 3a—3a of FIG. 3, and on approximately the same scale.
Figure 3:
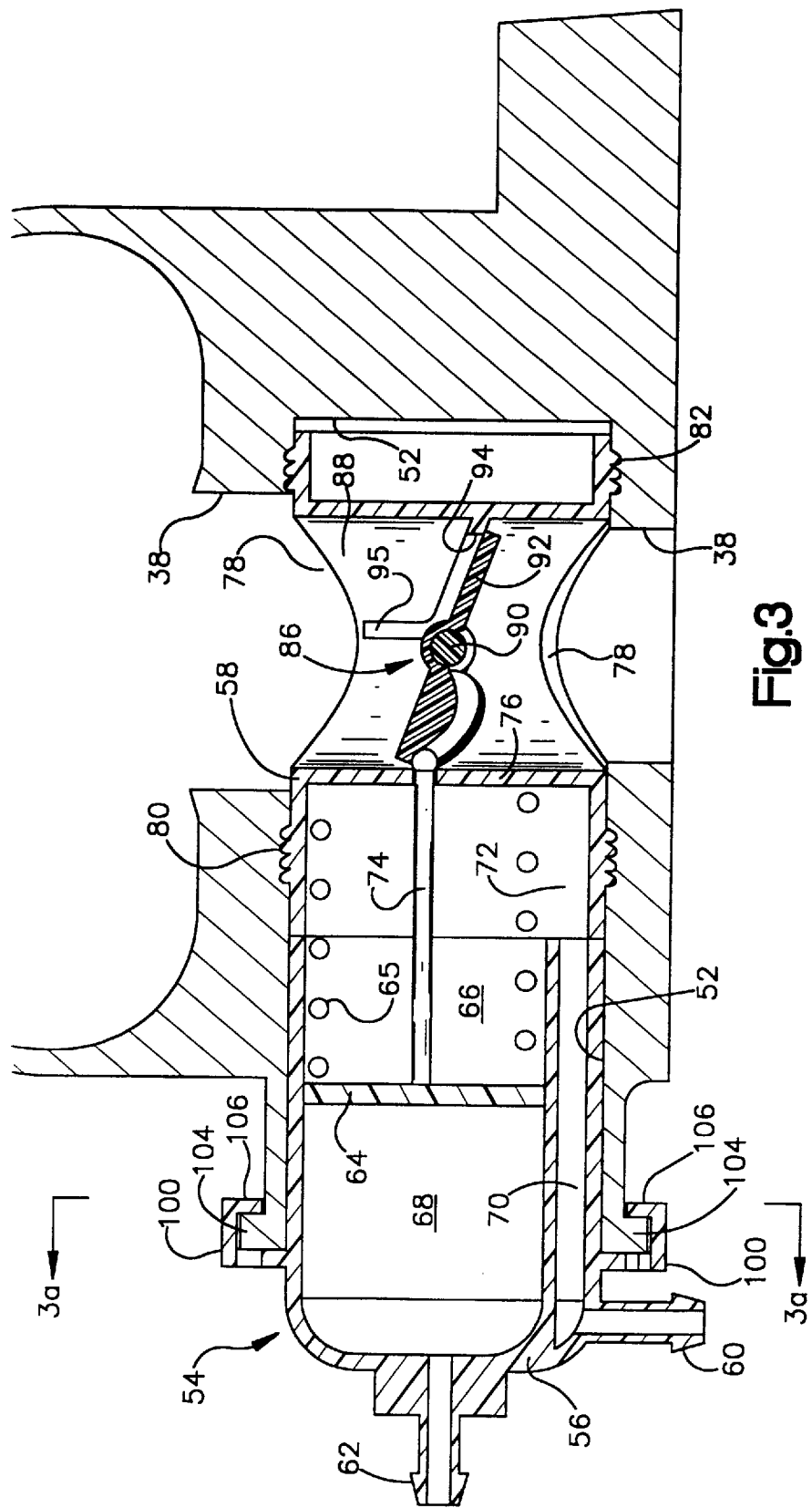
FIG. 3 is a transverse cross-section through the blower housing, illustrating the modular bypass valve in its assembled position.

Referring now to FIG. 3, in conjunction with FIG. 2, the bypass passage 38 is generally cylindrical and is oriented vertically as the blower 26 is viewed in FIGS. 2 and 3. FIG. 3 is a transverse cross section taken on the axis of the bypass passage 38. The inlet housing 48 further defines a bypass bore 52 which, as may best be seen in FIG. 3, extends to the exterior of the inlet housing 48, then extends to the right in FIG. 3, intersecting the bypass passage 38, and extending slightly to the right thereof. Preferably, the axes of the passage 38 and the bore 52 would coincide, although such would not be absolutely essential to the invention. Disposed within the bypass bore 52 is a bypass valve module, generally designated 54.

Referring now primarily to FIGS. 3 and 4, the bypass valve module 54 includes a housing assembly 55 (the reference numeral 55 being shown only in FIG. 4) comprising a signal housing 56 and a valve housing 58. Preferably, both the signal housing 56 and the valve housing 58 comprise any suitable plastic material which can withstand the temperatures encountered typically by engine accessories, and in the subject embodiment, both of the housings 56 and 58 comprise injection molded parts. The manner in which the housings 56 and 58 are joined is believed to be within the ability of those skilled in the art, is not an essential feature of the invention, and will not be described in detail herein. Among the standard methods of joining such injection molded plastic members would be some sort of snap arrangement, the use of a thread connection, or sonic welding.

The signal housing 56 includes a fitting 60, which is preferably molded integral with the housing 56, and comprises a vacuum port, adapted for connection to the vacuum line 46 of FIG. 1. Similarly, the signal housing 56 includes a fitting 62, which is also preferably molded integral with the housing 56, and comprises a pressure port, adapted for connection to some portion of the intake manifold, such as the duct 36. It will be understood by those skilled in the art that either or both of the ports 60 and 62 may be utilized to control the operation of the bypass valve module 54, and the specific control arrangement is not an essential feature of the present invention.

The signal housing 56 and valve housing 58 cooperate to define a chamber which is separated by a diaphragm 64, biased to the left in FIG. 3 by a coiled compression spring 65, into a vacuum chamber 66 and a pressure chamber 68. The vacuum port 60 is in communication with the vacuum chamber 66 by means of a passage 70, defined by the signal housing 56, and an opening 72, defined by the valve housing 58. Similarly, the pressure port 62 is in open communication with the pressure chamber 68. The diaphragm 64 is connected to a lever or rod 74 which passes through an end wall 76. The lever 74 is utilized to actuate the bypass valve in a manner to be described subsequently.

The valve housing 58 defines a pair of openings 78, only one of which is shown in FIG. 4. The openings 78 are aligned with the bypass passage 38, when the module 54 is in its assembled position of FIGS. 3 and 3a, to permit fluid flow through the passage 38, whenever the bypass valve is open.

Referring now primarily to FIG. 4, the valve housing 58 defines a set of sealing ridges 80 which extend around the entire circumference of the housing 58, to the left of the valve passage 38 in FIG. 3. Similarly, the valve housing 58 defines a set of sealing ridges 82 which also extend around the entire circumference of the housing 58, and are disposed to the right of the bypass passage 38 in FIG. 3. Finally, the valve housing 58 defines two sets of sealing ridges 84 (only one of which is shown in FIG. 4), each of the sets of sealing ridges 84 being disposed intermediate the openings 78, and being diametrally opposite each other.

As may be seen from viewing FIG. 3, in conjunction with FIG. 4, the bypass bore 52 is larger in diameter than the bypass passage 38, and the sets of sealing ridges 80 and 82 sealingly engage the bypass bore 52, isolating it from communication with the bypass passage 38. The two sets of sealing ridges 84 isolate the bypass passage 38, upstream of the bypass valve, from the bypass passage, downstream of the bypass valve. It is one important aspect of the present invention that, because the valve housing 58 is molded, and the sealing ridges 80, 82, and 84 are molded integrally therewith, it is not necessary to machine the bypass bore 52, and the bore 52 may be utilized in its as-cast condition, thus substantially reducing the cost of machining the inlet housing 48.

Disposed within the valve housing 58 is a bypass valve assembly, generally designated 86, which serves the function of the bypass valve 42 of FIG. 1. The valve housing 58 defines a cylindrical bore 88, extending between the openings 78, and extending diametrally across the bore 88 is a valve shaft 90, supported at its opposite ends by the valve housing 58. Pivotally mounted on the valve shaft 90 is a butterfly-type valve member 92. As may best be seen in FIG. 5, the cylindrical bore 88 defines a sealing lip 94, the bottom surface of which serves as a sealing surface 94s, against which the butterfly valve 92 is seated in the closed position of FIG. 3. The sealing lip 94 is generally half-circular, and at its diametrically opposite ends, includes a pair of vertical ends 95, only one of which is shown in any one of FIGS. 3–5, the function of the vertical ends 95 to be described subsequently. Although the invention is illustrated and described in connection with a bypass valve 92 of the butterfly type, and the novel butterfly-type valve 92 is believed to be inventive in and of itself, those skilled in the art will recognize that various other valve structures could be the functional and structural equivalent thereof. For example, various types of poppet valves could be utilized which would also be simple, inexpensive, could be actuated in a similar manner, and most importantly, could readily be used in the module 54.

Formed integrally with the butterfly valve 92 is a cam portion 96 which receives the inner end (right end in FIG. 5) of the lever or rod 74, which preferably includes a generally spherical cam actuating portion 98 (see FIG. 5). The spherical portion 98 is received within an arcuate groove 98g (see FIG. 5a). As may be appreciated by comparing FIGS. 3 and 5, as the diaphragm 64 moves to the right, the lever 74 and cam actuating portion 98 also move to the right. The axis of the lever 74 is offset from the axis of the valve shaft 90, and the cam portion 96 and groove 98g are appropriately sloped, such that movement of the cam actuating portion 98 to the right in FIG. 3 pivots the butterfly valve 92 clockwise, from the closed position of FIG. 3 to the fully open position of FIG. 5. When the butterfly valve 92 approaches the fully open position of FIG. 5, the portions of the valve 92 on either side of the cam portion 96 engage the vertical ends 95 of the sealing lip 94, thus limiting the pivotal movement of the valve 92 to that shown in FIG. 5.

When the butterfly valve 92 is in the fully open position of FIG. 5, the plane of the valve 92 lies generally along the axis of the cylindrical bore 88. In accordance with one aspect of the invention, the sealing lip 94, and the sealing surface 94s lie in a plane which forms an acute angle with the axis of the bore 88. In other words, and as may be seen in FIG. 3, when the butterfly valve 92 returns to the closed position, it is not oriented perpendicular to the axis of the bore 88. Instead, the butterfly valve 92 seats against the sealing surface 94s, such that flow past the valve 92 (at least in the region of the sealing lip 94) is substantially eliminated. However, at the same time, there does not have to be an extremely close tolerance maintained with regard to the outside diameter of the butterfly valve 92 and the inside diameter of the bore 88, and yet the present invention eliminates any opportunity for the butterfly valve 92 to become wedged or stuck within the bore 88. It should also be noted that the improved butterfly valve of the present invention eliminates the need for any sort of external adjustment mechanism, to control the position of the butterfly valve 92, or limit the movement thereof, as it approaches either the fully closed position of FIG. 3 or the fully open position of FIG. 5.

Referring now primarily to FIGS. 2–4, the assembly of the bypass valve module 54 into the inlet housing 48 will be described. Formed integrally with the signal housing 56 is a pair of diametrically opposed, retaining portions 100, each of which includes an opening 102 (see FIG. 4, in which only one is fully visible). Cast integrally with the inlet housing 48, and disposed on diametrally opposite sides of the bypass bore 52, is a pair of retaining members 104 (see FIG. 3), each of the retaining members 104 having a circumferential extent less than that of its respective opening 102. At assembly, the bypass module 54 is inserted into the bypass bore 52, with the module 54 being rotationally oriented such that the retaining members 104 are circumferentially aligned with the openings 102. The various parts of the bypass module 54 are made such that, with the module 54 rotated such that the retaining members 104 are circumferentially aligned with the openings 102, the bore 88 and the bypass passage 38 are not coaxial.

When the module 54 is fully inserted to its assembled position, as shown in FIG. 3, with the retaining members 104 received within the retaining portions 100, the next step is to rotate the module 54 so that the bore 88 is axially aligned with the bypass passage 38, as in FIG. 3. As viewed from the right in FIG. 3, the module 54 would be rotated counterclockwise, such that the members 104 are no longer in circumferential alignment with the openings 102, but instead, are aligned with solid portions 106, both of which are visible in FIGS. 3 and 4.

Although various other retention configurations are functionally and structurally equivalent to that shown herein, the retention arrangement of the subject embodiment is simple and inexpensive. All of the parts involved in the retention arrangement are either molded, or are used in their as-cast condition, such that no machining is required. Also, the total time for assembly is simply the time required to insert the module 54 and rotate it, as described previously, then connect one or two lines to whichever of the ports 60 and 62 is being used in the particular vehicle application.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A rotary blower of the backflow type comprising a housing assembly defining an inlet port and an outlet port, and a blower chamber disposed intermediate said inlet port and said outlet port; blower means disposed in said blower chamber for effecting transfer of volumes of inlet port fluid to said outlet port; said housing assembly defining a bypass passage providing fluid communication from said outlet port to said inlet port, bypassing said blower chamber; a bypass valve member disposed in said bypass passage, and movable between a closed position blocking flow through said bypass passage, and an open position permitting flow through said bypass passage in response to an external input pressure signal; characterized by:

(a) said housing assembly defining a bypass bore, open to the exterior of said housing assembly, and intersecting said bypass passage;

(b) a bypass module disposed within said bypass bore, and including a housing assembly defining a signal pressure chamber and an external signal port, adapted for connection to said input pressure signal, and in open communication with said signal pressure chamber;

(c) said housing assembly of said module including a valve housing disposed within said bypass passage, and defining openings to permit fluid flow through said bypass passage whenever said bypass valve member is in said open position; and (d) said bypass valve member being disposed within said valve housing of said housing assembly, and comprising a movable valve member, movable between said open position and said closed position, said bypass module including means operable to translate changes in said input pressure signal into movement of said bypass valve member.

2. A rotary blower as claimed in claim 1, characterized by said blower chamber comprising a pair of parallel, transversely overlapping cylindrical chambers and said blower means comprises a pair of meshed, lobed rotors rotatably disposed in said cylindrical chambers.

3. A rotary blower as claimed in claim 1, characterized by said blower housing assembly includes a cast housing member defining said bypass bore, said bypass bore remaining in the as-cast condition.

4. A rotary blower as claimed in claim 3, characterized by said valve housing of said module housing assembly including seal means operable to seal within said bypass bore on opposite sides of said openings defined by said valve housing.

5. A rotary blower as claimed in claim 1, characterized by said blower housing assembly and said module housing assembly cooperating to define retention means operable, after insertion of said bypass module into said bypass bore to an assembled position, to maintain said bypass module in said assembled position.

6. A rotary blower as claimed in claim 5, characterized by said retention means comprises one of said module housing assembly and said blower housing assembly defining a retaining portion forming a retaining opening and the other of said module housing assembly and said blower housing assembly defining a retaining member, passing through said retaining opening when said bypass module is moved toward said assembled position, said bypass module, when in said assembled position, being rotated to a position in which engagement of said retaining portion and said retaining member prevents axial movement of said bypass module within said bypass bore.

7. A rotary blower as claimed in claim 1, characterized by said movable valve member comprising a pivotable valve member, mounted for rotation about a valve shaft, and pivotable between said closed position and said open position.

8. A rotary blower as claimed in claim 7, characterized by said means operable to translate changes in said input pressure signal into pivotal movement of said bypass valve member comprises a diaphragm disposed in said signal pressure chamber and being axially movable therein in response to said changes in said input pressure signal, said diaphragm being biased by a spring toward a position corresponding to said closed position of said pivotable valve member.

9. A rotary blower as claimed in claim 8, characterized by said diaphragm including a lever member extending into said valve housing of said module housing assembly, said lever member being axially movable with said diaphragm in response to said changes in said input pressure signal, and said pivotable valve member includes a cam portion in operable engagement with said lever member, whereby axial movement of said lever member results in pivotal movement of said valve member.

10. A rotary blower as claimed in claim 1, characterized by said module housing member comprises a molded plastic member, and said valve housing comprises a molded plastic member.

11. A butterfly-type valve assembly adapted for use as a flow control valve, said butterfly valve assembly including a valve housing defining a generally cylindrical valve bore, and an opening disposed at each end of said valve bore; a butterfly-type valve member disposed within said valve bore, and means operably associated with said valve housing and said butterfly valve member, whereby said butterfly valve member is pivotable about a pivot axis thereof, between a closed position and an open position, in which a plane defined by said butterfly valve member is oriented generally axially of said valve bore; characterized by:

(a) said valve housing defining a sealing lip extending radially inwardly from said valve bore, said sealing lip extending circumferentially about a substantial portion of said valve bore, and defining a sealing surface;

(b) said butterfly-type valve member being disposed to engage said sealing surface of said sealing lip when said butterfly valve member is in said closed position; and (c) said sealing surface of said sealing lip defining a plane passing approximately through said pivot axis of said butterfly valve member, said plane defined by said sealing surface of said sealing lip cooperating with an axis defined by said valve bore to define an acute angle.

12. A butterfly-type valve assembly as claimed in claim 11, characterized by said means operably associated with said valve housing and said butterfly valve member comprises a valve shaft extending diametrically across said valve bore, said sealing lip extending circumferentially from about said valve shaft on one side of said valve bore to about said valve shaft on the opposite side of said valve bore.

13. A butterfly-type valve assembly as claimed in claim 11, characterized by said valve housing comprising a plastic molding, and said sealing lip being formed integrally with said valve housing.

14. A butterfly-type valve assembly as claimed in claim 13, characterized by said sealing lip including end portions oriented generally axially within said valve bore and disposed to limit pivotal movement of said butterfly valve member in said open position.

15. A butterfly-type valve assembly as claimed in claim 11, characterized by said butterfly valve member including a cam portion adapted for engagement with an input member, whereby axial movement of said input member results in pivotal movement of said butterfly valve member about said pivot axis.

16. A butterfly-type valve assembly adapted for use as a flow control valve, said butterfly valve assembly including a valve housing defining a generally cylindrical valve bore, and an opening disposed at each end of said valve bore; a butterfly-type valve member disposed within said valve bore, and means operably associated with said valve housing and said butterfly valve member, whereby said butterfly valve member is pivotable about a pivot axis thereof, between a closed position and an open position, in which a plane defined by said butterfly valve member is oriented generally axially of said valve bore; characterized by:

(a) said valve housing defining a sealing lip extending radially inwardly from said valve bore, said sealing lip extending circumferentially about a substantial portion of said valve bore, and defining a sealing surface;

(b) said butterfly-type valve member being disposed to engage said sealing surface of said sealing lip when said butterfly valve member is in said closed position; and (c) said butterfly valve member including a cam portion adapted for engagement with an input member, whereby axial movement of said input member results in pivotal movement of said butterfly valve member about said pivot axis.

* * * * *